US009856034B2

(12) United States Patent
Marche

(10) Patent No.: US 9,856,034 B2
(45) Date of Patent: Jan. 2, 2018

(54) AIRCRAFT NACELLE COMPRISING A DEVICE PROVIDING A VISUAL WARNING OF A LOCKING FAULT OF THE COWLS

(71) Applicant: Airbus Operations (SAS), Toulouse (FR)

(72) Inventor: Jacques Herve Marche, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 498 days.

(21) Appl. No.: 14/575,089

(22) Filed: Dec. 18, 2014

(65) Prior Publication Data

US 2015/0191257 A1     Jul. 9, 2015

(30) Foreign Application Priority Data

Jan. 7, 2014    (FR) ............................... 20140050081

(51) Int. Cl.
*B64D 45/00*      (2006.01)
*B64D 29/06*      (2006.01)
(Continued)

(52) U.S. Cl.
CPC ......... *B64D 45/0005* (2013.01); *B64D 29/06* (2013.01); *E05B 41/00* (2013.01);
(Continued)

(58) Field of Classification Search
CPC ..... B64D 45/0005; B64D 29/06; E05B 41/00; F01D 25/24; F05B 2240/14; F05D 2240/14
See application file for complete search history.

(56) References Cited

U.S. PATENT DOCUMENTS 3,194,595 A * 7/1965 Wheeler ............... E05C 19/145
                                                               292/113
4,613,099 A * 9/1986 Smith .................... B64D 29/06
                                                               244/129.4
(Continued)

FOREIGN PATENT DOCUMENTS

EP          0480827      4/1992
EP          0596070      5/1994

OTHER PUBLICATIONS

French Search Report, dated Sep. 15, 2014.

*Primary Examiner* — Dwayne J White
*Assistant Examiner* — Adam W Brown
(74) *Attorney, Agent, or Firm* — Greer, Burns & Crain, Ltd.

(57) ABSTRACT

An aircraft nacelle comprising a first and a second cowl mounted pivotably about an axis substantially parallel to a longitudinal axis of the nacelle and lockable to one another by at least one locking mechanism. The nacelle further comprises a device for providing a visual warning of a locking defect of the cowls. The device comprises a movable bolt associated with the locking mechanism and a movable edge plate mounted on the nacelle in line with said bolt with which it is associated, the movable edge plate being movable under the action of an operator between a protruding position, in which the edge plate is protruding from the nacelle and a locking mechanism is in an unlocked position, and a retracted position, in which the edge plate is immobilized within the nacelle by the bolt and the action of the locking of a locking mechanism.

20 Claims, 6 Drawing Sheets

(51) Int. Cl.
*F01D 25/24* (2006.01)
*E05B 41/00* (2006.01)

(52) U.S. Cl.
CPC .......... *F01D 25/24* (2013.01); *F05B 2240/14* (2013.01); *F05D 2240/14* (2013.01)

(56) References Cited

U.S. PATENT DOCUMENTS

| | | | |
|---|---|---|---|
| 4,679,750 A | | 7/1987 | Burhans |
| 5,203,215 A | | 4/1993 | Baudu et al. |
| 5,518,206 A | * | 5/1996 | Arnold .................... B64D 29/06 244/129.4 |
| 6,279,971 B1 | * | 8/2001 | Dessenberger, Jr. ... E05B 41/00 244/129.4 |
| 6,666,408 B1 | * | 12/2003 | De Carvalho ......... B64D 29/00 244/129.4 |
| 6,824,175 B2 | * | 11/2004 | Porte ...................... B64D 29/06 244/129.4 |
| 8,894,012 B2 | * | 11/2014 | Hemeury ............... B64D 29/06 244/129.4 |
| 9,132,920 B2 | * | 9/2015 | Provost ................. B64D 29/06 |

\* cited by examiner

US 9,856,034 B2

AIRCRAFT NACELLE COMPRISING A DEVICE PROVIDING A VISUAL WARNING OF A LOCKING FAULT OF THE COWLS

CROSS-REFERENCES TO RELATED APPLICATIONS

This application claims the benefit of the French patent application No. 20140050081 filed on Jan. 7, 2014, the entire disclosures of which are incorporated herein by way of reference.

BACKGROUND OF THE INVENTION

The present invention relates to an aircraft nacelle comprising cowls, cowl locking mechanisms, and a device for providing a visual warning of a locking fault of said mechanisms.

Document EP 0 596 070 already discloses such a device for providing a visual warning of a locking mechanism fault. This device is installed on the lower edge of a first cowl and comprises a sliding arm that is visible below the nacelle when the two cowls are in a position spaced from one another. When the cowls are closed, a pin connected to the second cowl engages with a seat formed in the arm so as to hold said arm in a retracted position. When the cowls are spaced apart and the lower edges thereof are spaced by a predetermined distance, the pin connected to the second cowl is no longer engaged in the seat in the arm, and said arm is thus freed and is arranged in the protruding position thereof in order to signal to the personnel on the ground that the two cowls are not closed. Although effective, such a device however is unable to indicate the presence of a locking fault of one of the locking mechanisms used to hold the cowls closed, since, because the cowls have a tendency, due to their weight, to position themselves in the closed position, the arm can be held in a retracted position even if a locking mechanism is in the unlocked state and is not holding the cowls in the closed position.

SUMMARY OF THE INVENTION

The present invention aims to overcome the disadvantages of the prior art. To this end, the invention relates to an aircraft nacelle comprising a first and a second cowl mounted pivotably about an axis substantially parallel to a longitudinal axis of the nacelle and lockable to one another by at least one locking mechanism, the nacelle further comprising a device for providing a visual warning of a locking defect of the cowls comprising a movable bolt and a movable edge plate mounted on the nacelle in line with said bolt with which it is associated, the movable edge plate being movable under the action of an operator between a protruding position, in which the edge plate is protruding from the nacelle, and a retracted position, in which the edge plate is immobilized within the nacelle by the bolt,
wherein the bolt is coupled to the locking mechanism, and
wherein the movable bolt comprises a rod, at least one control element and at least one return member, each control element being associated with said locking mechanism.

BRIEF DESCRIPTION OF THE DRAWINGS

Further features and advantages will become clear from the following description of the invention, which is given merely by way of example with reference to the accompanying drawings, in which.

DETAILED DESCRIPTION OF THE PREFERRED EMBODIMENTS

Throughout the description, the terms "front" and "rear" are to be considered in relation to a direction of travel of the aircraft, shown schematically by the arrow 500 in the Figures.

Figure 1:
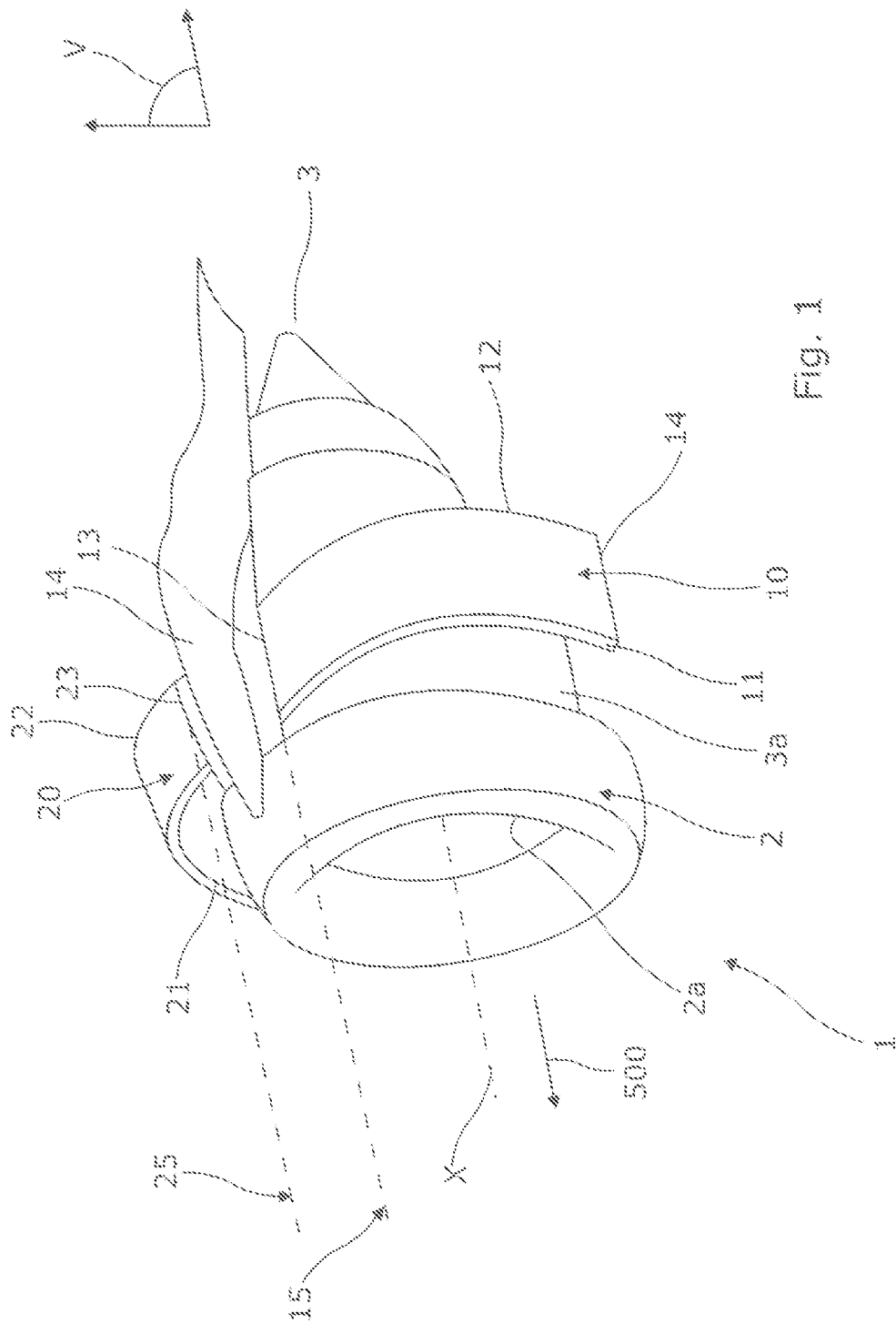
FIG. 1 is a perspective schematic view of a nacelle and of a stub, the nacelle comprising two cowls shown in the open position.
Figure 2:
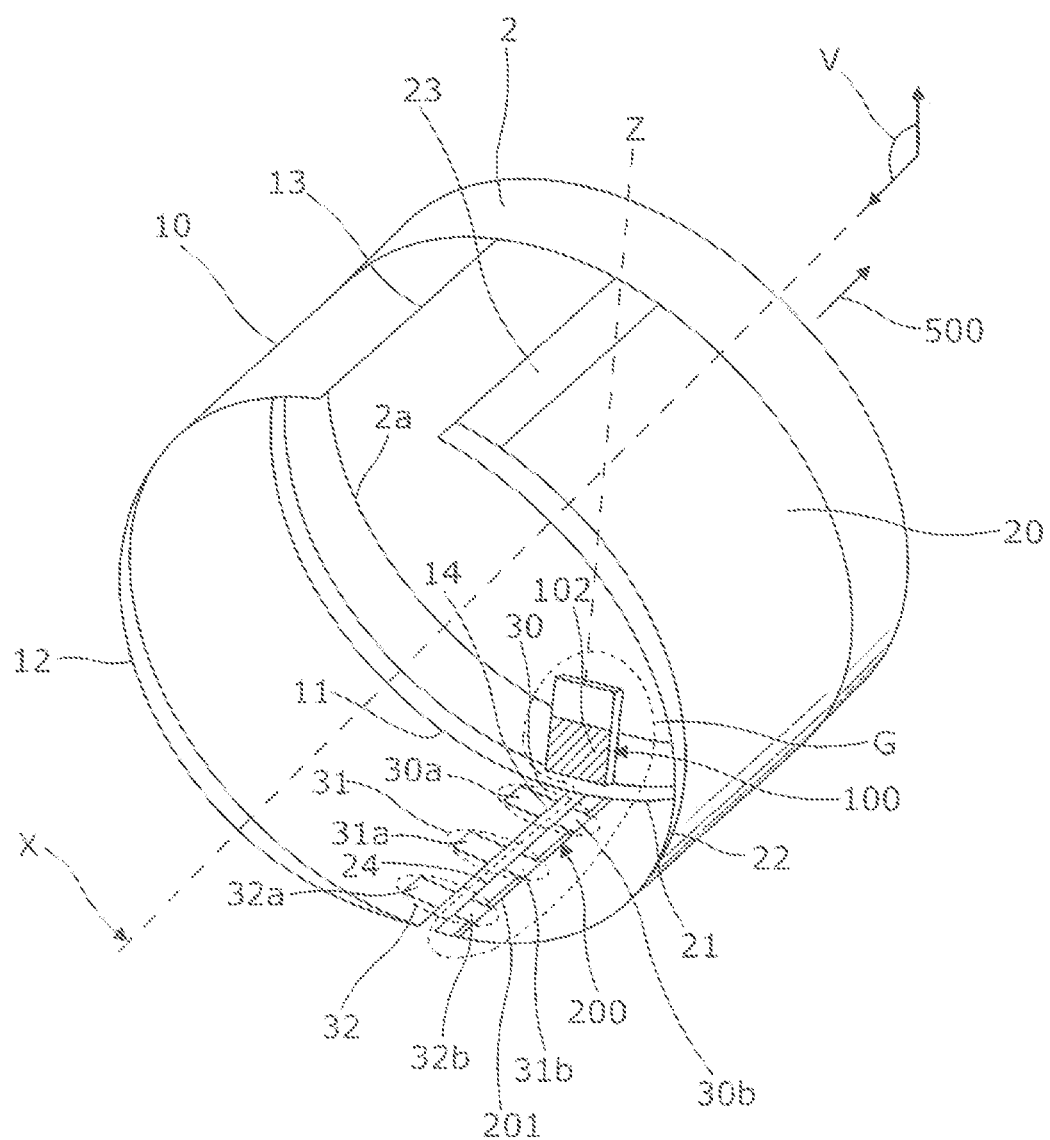
FIG. 2 is a schematic perspective view of the cowls of the nacelle in a half-opened position and illustrates a locking arrangement associated with a device for providing a visual warning of a locking fault in accordance with one embodiment of the invention.

FIGS. 1 and 2 show a stub 4 and an aircraft nacelle 2, the nacelle having a substantially cylindrical form centered around the longitudinal axis X thereof, as is known, and comprising a first and a second cowl 10, 20. The cowls are locked to one another via at least one locking mechanism 30, 31, 32.

The two cowls 10, 20 are distributed on either side of a vertical plane of symmetry V of the nacelle 2, this plane comprising the longitudinal axis X. As illustrated in FIG. 1, each cowl 10, 20 has a substantially semi-cylindrical form delimited laterally by a front lateral edge 11, 21 and a rear lateral edge 12, 22, and delimited heightwise by an upper edge 13, 23 and a lower edge 14, 24 (24 is not shown in FIG. 1). The upper and lower edges of the cowls are substantially parallel to the longitudinal axis X. Each of the cowls 10, 20 is hinged to the nacelle 2 at the upper edge 13, 23 thereof about a pivot axis 15, 25, parallel to the longitudinal axis X.

The first cowl 10 and the second cowl 20 are hinged in rotation about the pivot axis thereof between a closed position, also referred to as the position of use, and an open position (see FIG. 1). In the closed position, the first cowl 10 and the second cowl 20 are in abutment, at the lower edges 14, 24 thereof, which are thus arranged in the vertical plane of symmetry V of the nacelle 2, at the lower part of the nacelle 2.

In the example illustrated in FIG. 2, the cowls 10, 20 are locked to one another via a locking arrangement comprising three locking mechanisms 30, 31, 32 distributed along the longitudinal axis X.

Each locking mechanism 30, 31, 32 comprises, as is known, a fixed part of the catch element type, 30-32*a* respectively, and a movable part of the latch type hinged about an axis parallel to the longitudinal axis, 30*b*-32*b* respectively. The catch element 30*a*-32*a* is mounted on the inner face and at the lower edge 14 of the first cowl 10, whereas the latch 30*b*-32*b* is mounted on the inner face and at the lower edge 24 of the second cowl 20. The latch 30b-32b is able to adopt two states: a first locked state (corresponding to the locked state of the locking mechanism), in which it is caught on the catch element 30a-32a so as to hold the cowls 10, 20 in a closed position, and a second unlocked state (corresponding to the unlocked state of the locking mechanism), in which it is not caught on the catch element.

Figure 3:
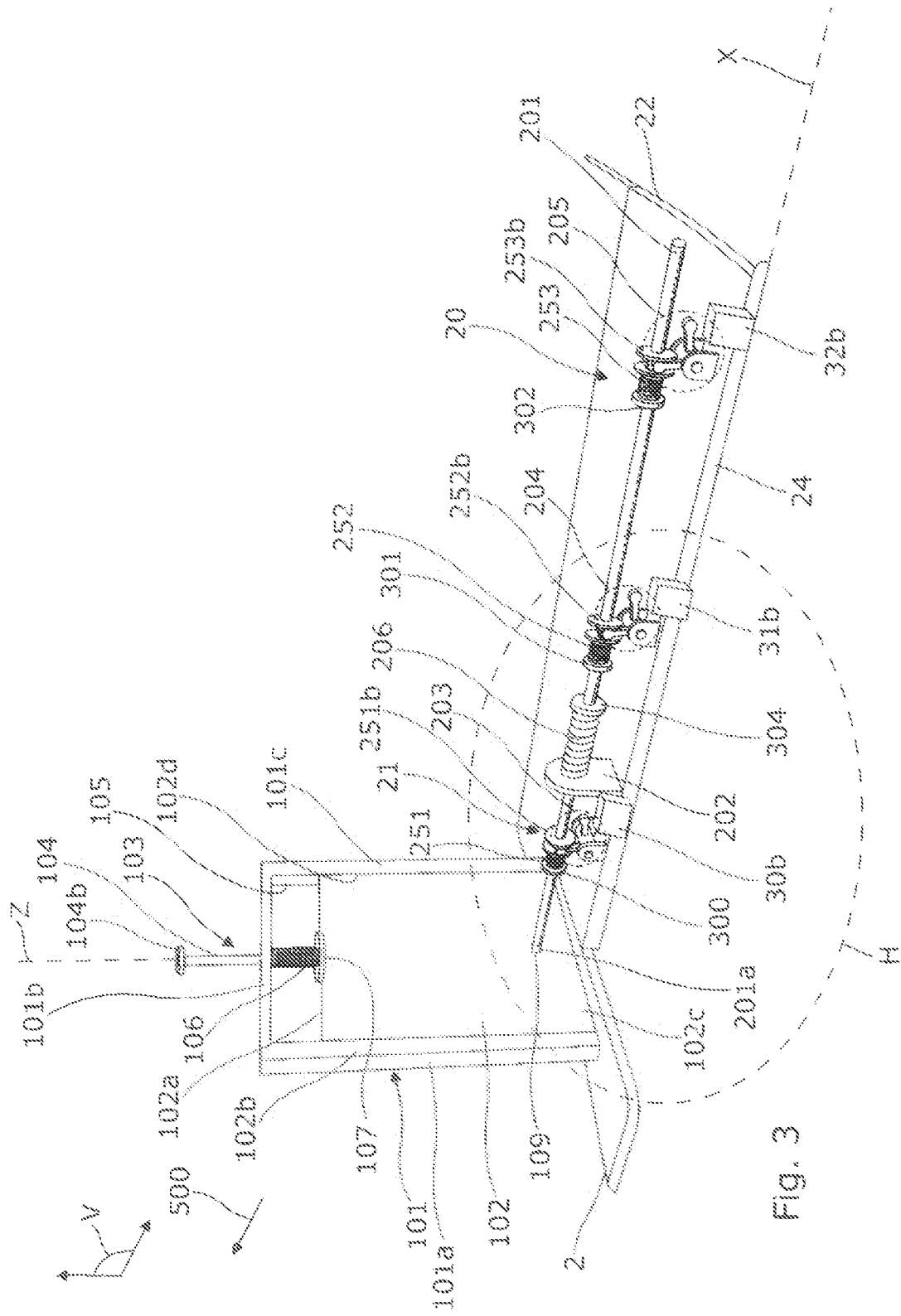
FIG. 3 is a schematic view on a larger scale of zone G in FIG. 2 and illustrates the details of the locking mechanism and of the device for providing a visual warning of a locking fault in accordance with one embodiment of the invention.

FIG. 3 and the following Figures show each latch 30b-32b in the schematic form of a bearing surface able to move in translation parallel to a vertical axis Z, perpendicularly to the longitudinal axis X of the nacelle 2.

The nacelle comprises a device for providing a visual warning of a locking fault of the cowls associated with the locking mechanisms. In accordance with the invention, the visual warning device comprises a movable bolt 200 associated with the locking mechanisms 30, 31, 32 and a movable edge plate 100 mounted on the air inlet 2a of the nacelle in line with said bolt with which it is associated.

The bolt 200 comprises a rod 201 mounted freely in translation, along an axis parallel to the longitudinal axis X, on at least one flange 202 via at least one control element 203, 204, 205 and at least one return member 206 associated with an edge plate 202. Each control element is associated with a latch 30b-32b of the locking mechanism 30, 31, 32. In the example illustrated in FIG. 2, where three locking mechanisms are shown, the bolt comprises three control elements and a single return member.

Figure 5:
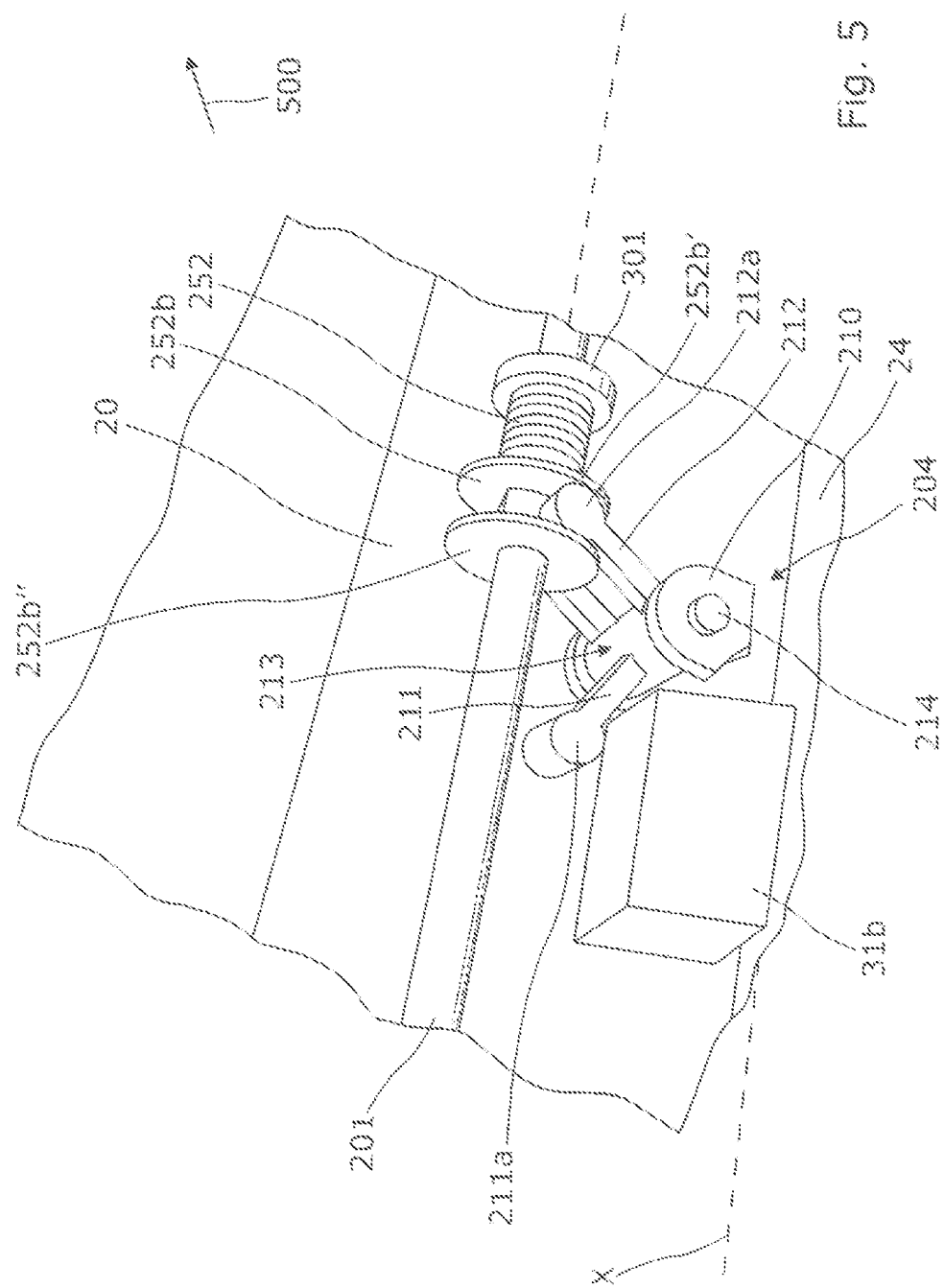
FIG. 5 is an enlarged view of zone J shown in FIG. 4 and illustrates a portion of the device for providing a visual warning of a locking fault associated with a portion of the locking mechanism in accordance with one embodiment of the invention.

As can be seen in FIG. 5, each control element 204 comprises a lever 213 mounted in a manner hinged on a clevis 210 about a pivot axis 214 perpendicular to the rod 201. The clevis 210 is fixed to the inner wall of the second cowl 20, in the proximity of the lower edge 24 thereof. The lever 213, in a plane transverse to the pivot axis 214, generally has the shape of an "L" and is formed of a first branch 212 having a fork shape in a plane parallel to the pivot axis 214 and of a second branch 211.

The free end 211a of the second branch 211 is configured to cooperate with the latch 31b of the locking mechanism 31.

The fork 212 of the lever is associated with a collar 252b mounted movably on the rod 201. The collar 252b is cylindrical and has an annular throat defining two annuli 252b', 252b" at the ends of the collar. The free ends 212a, 212b (212a not shown in the Figures) of the fork are configured to be received in the annular throat, between the two annuli 252b', 252b" forming a stop for the free ends 212a, 212b of the fork 212 (as can be seen in FIG. 5).

The rod 201 comprises a shoulder or stop 300, 301, 302 associated with each collar of the control element. As can be seen in FIGS. 2 and 3, a return spring 251, 252, 253, for example a coil spring, is inserted around the rod 201 between a shoulder 300, 301, 302 and a collar 251b, 252b, 253b of which one annulus forms a bearing surface for one end of the spring. A shoulder 300, 301, 302 associated with a collar, 251b, 252b, 253b respectively, is arranged in front of the collar.

The rod 201 also comprises a stop 304, having the form of a shoulder, arranged at a distance from the flange 202 and associated with the return member 206. The return member 206, which may be a compression spring, for example a coil spring, is inserted over the rod 201 and is arranged between the flange 202 and the stop 304.

It will be noted in FIG. 3 that the flange 202 is fixed on the inner face of the second cowl 20, between the latch 30b of a first locking mechanism 30 and a latch 31b of a second locking mechanism 31. The stop 304 is arranged behind the flange 202.

The movable edge plate 100 comprises a panel 102 mounted movably in translation on a guide support 101, at the air inlet 2a, and a return member 103.

The panel 102 is flat, rectangular and advantageously painted a bright color, for example red or orange. It comprises four edges, which are parallel in twos: two lateral edges 102b, 102d, and an upper edge 102a and a lower edge 102c of shorter length than the two first lateral edges 102b, 102d. The panel 102 comprises a through-hole 109 forming an outlet for the free end of the rod 201 of the bolt 200.

The guide support 101 of the panel 102 is fixed on the inner surface of the nacelle 2, at the junction between the nacelle 2 and the front lateral edges 11, 21 of the cowls 10, 20 when said cowls are closed. The guide support 101 takes the form of a hollow framework arranged in a vertical plane perpendicular to the vertical plane of symmetry V of the nacelle 2 and comprises two lateral legs 101a, 101c parallel to one another and an upper leg 101b. Each of the lateral legs 101a, 101c is fixed at a first end to the nacelle 2 and at a second end to the upper leg 101b.

Each lateral leg 101a, 101c comprises, over the entire length thereof, a groove 105 (shown only for the leg 101c) facing the groove in the other lateral leg. Each groove 105 is formed so as to accommodate a lateral edge 102b, 102d of the panel 102. It should be noted that, although not visible in the Figures, the nacelle 2 comprises a slot, formed in the extension of the framework (each groove leads into the slot), via which slot the panel 102 can slide relative to the nacelle 2. In addition, a through-hole (not shown in the Figures) is formed in the upper leg 101b of the framework, for example in the middle thereof.

The panel 102 is pushed in a protruding position, that is to say partly outside the framework, by a return device 103 comprising a shaft 104, a compression member 106 and a washer 107.

The shaft 104 is inserted into the hole formed in the upper leg of the framework. This hole has a diameter equal, within a tolerance, to that of the shaft 104, which can then move in translation relative to the framework. The shaft 104 has an end fixed to the upper edge 102a of the panel and comprises at the free end thereof a part 104b forming a stop so as to limit the movement in translation of said shaft.

The compression member 106, for example a coil compression spring, is inserted around the shaft 104, between the upper leg 101b of the framework and the upper edge 102a of the panel 102. The washer 107 is inserted around the shaft 104 and is arranged between the compression member 106 and the upper edge 102a. When the upper edge 102a of the panel is moved closer to the upper leg 101b by a distance shorter than the length of the compression member 106, said compression member exerts a force that pushes the panel from the framework.

The panel 102 inserted into the perpendicular framework is movable, via the slot, in a substantially vertical movement in translation along the axis Z between a retracted position, in which it is fully comprised in the area delimited by the nacelle 2 and therefore does not pass beyond the slot, and the protruding position. The compression member 106 tends to displace the panel 102 into the protruding position. The position of the stop 104b is defined such that, when the panel 102 is in the protruding position, at least half of the panel 102 is visible from outside the nacelle 2.

The operation of the visual warning device according to the invention will now be described with reference to FIGS. 3 and 6A to 6C.

When the latch 30b-32b of a locking mechanism passes from the unlocked state into the locked state, the upward movement in translation of the latch with which the second branch 211 of the lever cooperates causes a rotation of the fork 212 of said lever in a forward direction. The collar 252*b* with which the fork cooperates then moves in translation in a forward direction, on the rod 201.

The return member 206 of the bolt 200, when compressed, bears against the flange 202 and against the stop 304. The return member is defined such that it has a rate K and, when the stop 304 is moved closer to the flange 202 by a distance shorter than the length of the return member 206, exerts a force F that pushes the stop 304 from the flange 202 and thus causes the rod 201 to move in translation in a rearward direction.

The springs 251, 252, 253 are defined such that they have a rate k and, when the collar associated with a spring, 251*b*, 252*b*, 253*b* respectively, is moved closer to the shoulder, 300, 301, 302 respectively, by a distance shorter than the length of the spring, said spring exerts a force f that pushes the shoulder from the collar, and thus pushes the rod 201 in a forward direction.

Thus, when the three latches 30*b*, 31*b*, 32*b* are in the locked state, the springs 251, 252, 253 each exert a force f that pushes the shoulders, 300, 301, 302 respectively, of the collars, 251*b*, 252*b*, 253*b* respectively, and thus pushes the rod 201 in a forward direction. The force f exerted by each of the springs 251, 252, 253 thus opposes the force exerted F by the return member 206.

Figure 4:
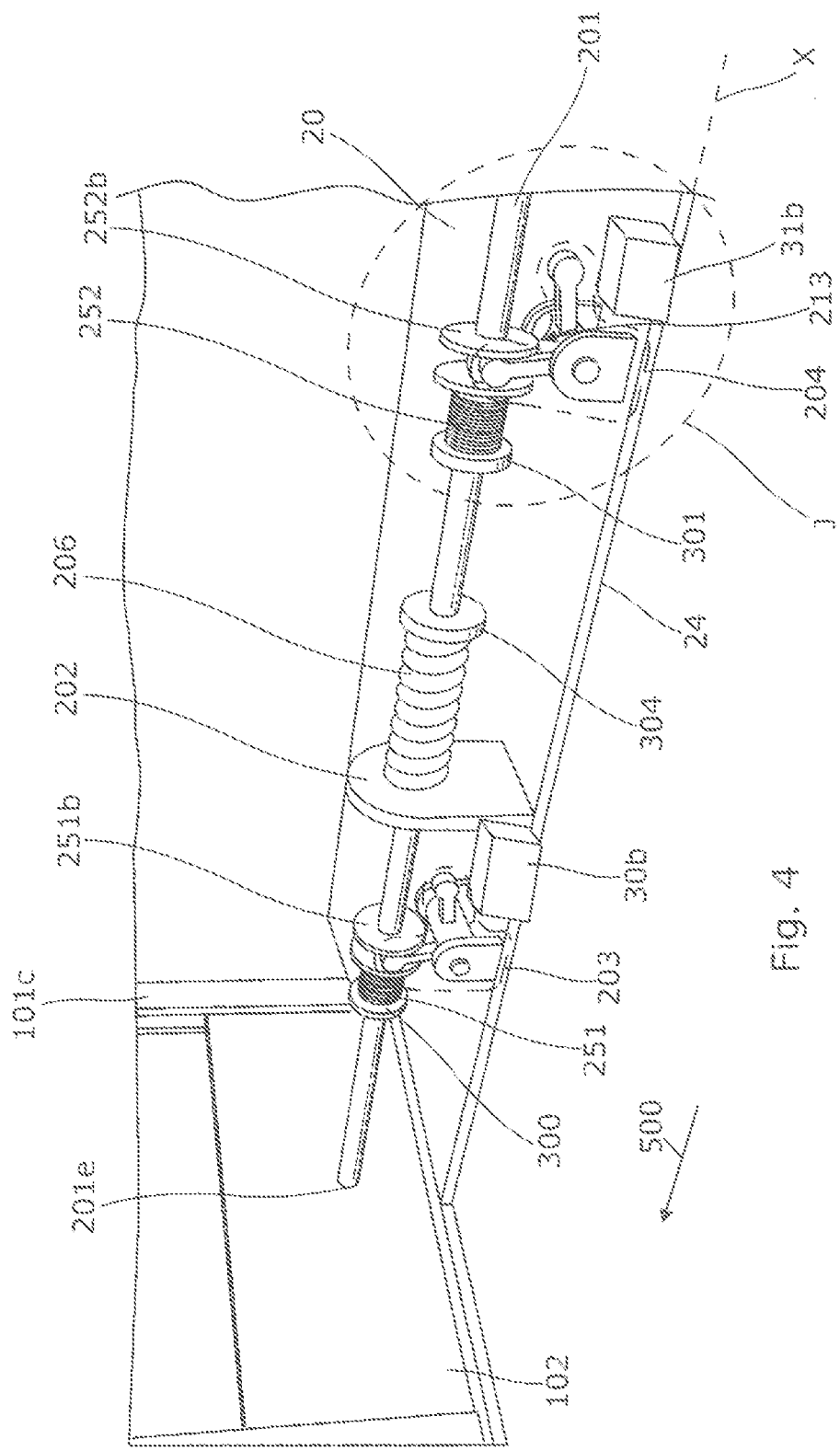
FIG. 4 is an enlarged view of zone H of FIG. 3.

In accordance with the invention, the rate K of the return member 206 is between (n−1) and n times (exclusive of these two limits), n being the number of springs, the rate k of a spring 251, 252, 253. It should be noted that n=3 in the example illustrated in FIGS. 4 to 6. Thus, the rod 201 can only move in translation in a forward direction if all the latches 31*b*, 32*b*, 33*b* are in the locked state, since in this case the sum of forces f exerted by each of the springs 251*a*, 252*a*, 253*a* is greater than the force exerted F by the return member 206.

The rod 201 may thus assume two positions:
a position referred to as a return position when at least one of the latches is not in the locked state: in this case, the front end 201*a* of the rod does not protrude beyond the front lateral edge 21 of the second cowl 20; and
a position referred to as a release position when all the latches are in the locked state: in this case, the front end 201*a* of the rod 201 protrudes beyond the front edge 21 of the second cowl 20 by a distance e.

With reference to FIG. 3, the movable edge plate 100 and the bolt 200 are arranged relative to one another such that when the rod 201 is in the return position, the panel 102 is arranged at a distance shorter than the distance e from the front end 201*a* of the rod 201.

The rod 201 is a cylindrical shaft of which the length is approximately equal to the length of the lower edge 24 of the second panel 20. The diameter of the shank of the rod 201 is substantially equal, within a tolerance, to the diameter of the through-hole 109 formed in the panel 102. Thus, when the rod 201 is in the release position, the front end 201*a* thereof can be inserted into the hole 109 provided in the panel 102 after displacement upwardly (toward the interior of the nacelle) of the movable edge plate 100 by an operator.

Figure 6A:
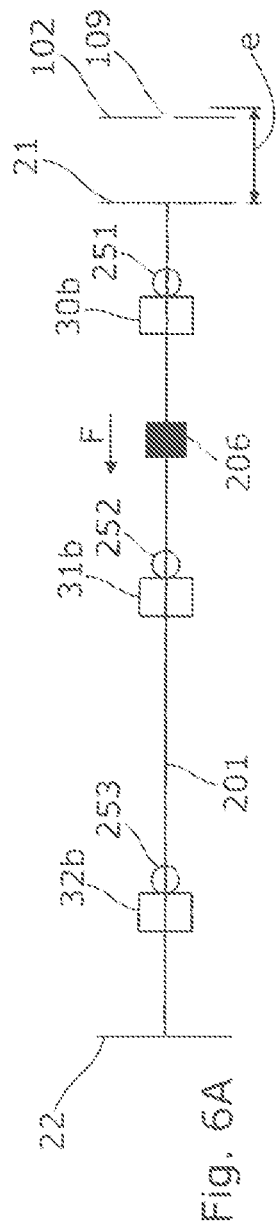
FIGS. 6A, 6B and 6C illustrate, in accordance with one embodiment of the invention, the functioning of the device for providing a visual warning of a locking fault depending on the locked or unlocked state of the locking arrangement shown in FIG. 2.
Figure 6B:
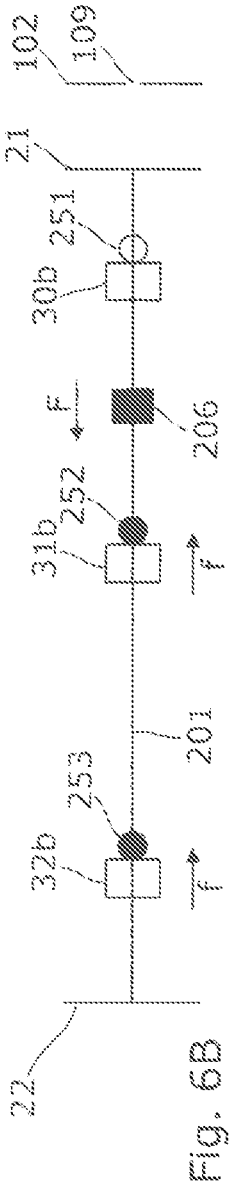
Figure 6C:
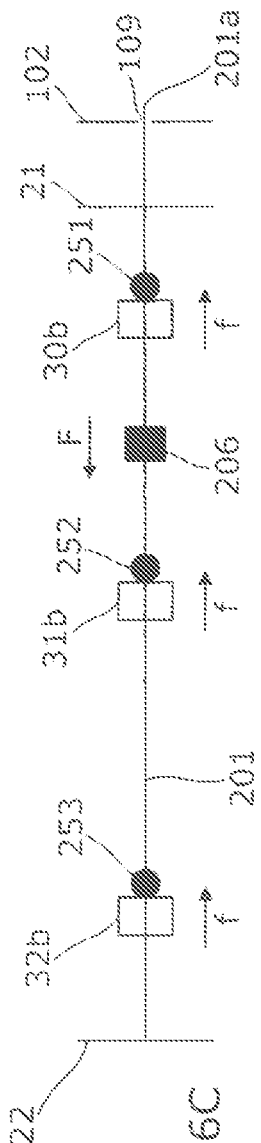

With reference to FIGS. 6A, 6B and 6C, the indicator device according to the invention is able to function as follows.

When the two cowls 10, 20 are in the open position, the latches 31*b*, 32*b*, 33*b* are all in the unlocked state. This state is shown in FIG. 6A by an empty circle and signifies an absence of force exerted on the rod 201 by the spring 251, 252, 253 associated with a latch, 31*b*, 32*b*, 33*b* respectively. The rod 201 is in this case in the return position, in which it does not cooperate with the panel 102 and said panel, under the effect of the action of the return member 103, is in a protruding position (that is to say visible outside the nacelle), so as to indicate that the locking mechanisms 30, 31, 32 are not locked.

Once the various maintenance operations are complete, the cowls 10, 20 are swiveled so as to be fixed to one another, and the operator then locks the locking mechanisms 30, 31, 32. With reference to FIG. 6B, the latches 31*b*, 32*b* of the locking mechanisms 31 and 32 are locked, this state being shown by a filled circle and signifying a force f, directed toward the panel, exerted on the rod 201 by a spring 252, 253 associated with a latch, 31*b*, 32*b* respectively. The latch 30*b* of the locking mechanism 30 is in the unlocked state, this schematic state being shown by an empty circle and signifying an absence of force exerted on the rod 201 by the spring 251 associated with this latch. The sum of the forces 2×f provided by the springs is not sufficient to overcome the force F, directed in a rearward direction, of the return member 206, which force holds the rod 201 in the return position thereof.

With reference to FIG. 6C, when the operator has locked all the latches of the locking mechanisms, the locking mechanism denoted 30 is in the locked state, this state being shown schematically by a solid circle and signifying a force f directed toward the panel, exerted on the rod 201 by the spring 251. The sum of the forces 3×f of the three springs 205*a*, 204*a*, 203*a* is greater than the force F exerted by the return member 206. Consequently, under the action of the 3 springs 251, 252, 253, the rod 201 moves in the direction of the panel 102 by a distance e such that the end 201*a* of the rod 201 comes to bear against the panel 102. The operator can then move the panel 102 upwardly along the vertical axis Z until the hole 109 formed in the lower part of the panel 102 is aligned with the end 201*a* of the rod 201, which is then introduced into the hole 109. In this way, the panel 102 is held in the retracted position by the rod 201.

Once all the locking mechanisms are in the locked state and once the panel 102 is in the retracted position, the operator can open the cowls 10, 20 by unlocking the locking mechanisms. When the latch 30*b*-32*b* of a locking mechanism passes from the locked state into the unlocked state, the movement in translation downwardly of the latch with which the second branch 211 of a control element cooperates causes a movement in rotation, in a rearward direction, of the fork 212 of the control element. The collar 252*b* with which the fork cooperates moves in translation in this case in a rearward direction, on the rod 201. The unlocking of just one of the locking mechanisms 30, 31, 32 causes a switch into a return position of the rod 201, since, as explained with reference to FIG. 6B, the sum of the forces 2×f provided by two springs is not sufficient to overcome the force F, directed in a rearward direction, of the return member 206, which holds the rod 201 in the return position thereof. In this case, the panel 102, under the effect of the return member 103, assumes the protruding position, which is indicative of a locking fault of at least one latch.

The invention allows easier visual detection of the unlocked state of a latch of a locking mechanism of an aircraft nacelle. This indicator device is advantageous in that it requires an operator to act on the movable edge plate in order to place the panel in a retracted position, and in that the panel does not remain in this position if one or more of the locking mechanisms is/are not locked. Moreover, the invention is conceived such that the installation thereof in a nacelle does not alter the existing locking mechanisms.

In a variant of the embodiment just described, the movable edge plate 100 is mounted on the cowl 20 comprising the latches 30b-32b of the locking mechanisms. In this case, the guide support 101 of the panel 102 is fixed on the inner surface of the cowl 20 at the front lateral edge 21 of the cowl 20.

The cowl 20 comprises a slot, via which the panel 102 can slide relative to the cowl 20. The movable edge plate 100 is movable under the action of an operator between a protruding position, in which the edge plate protrudes beyond the nacelle (and more precisely from the cowl 20) and a locking mechanism is in the unlocked position, and a retracted position, in which the edge plate is immobilized within the nacelle by the bolt and the action of the locking of a locking mechanism (30, 31, 32).

The rod 201 for its part has a length shorter than the length of the lower edge 24 of the second cowl 20 and can assume two positions:

a positioned referred to as a return position when at least one of the latches is not in the locked state: in this case, the front end 201a of the rod is located at a distance e from the front lateral edge 21 of the second cowl 20, set back with respect to the front edge 21; and a position referred to as a release position when all the latches are in the locked state: in this case, the front end 201a of the rod 201 reaches the front edge 21 of the second cowl 20.

The movable edge plate 100 and the bolt 200 are arranged relative to one another such that the rod 201 is in the return position, and the panel 102 is arranged at a distance shorter than the distance e from the front end 201a of the rod 201.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft nacelle comprising:
a first and a second cowl mounted pivotably about an axis substantially parallel to a longitudinal axis of the nacelle and lockable to one another by at least two locking mechanisms,
a device for providing a visual warning of a locking defect of the cowls comprising a movable bolt and a movable edge plate mounted on the nacelle in line with said movable bolt with which the movable edge plate is associated, the movable edge plate being movable under the action of an operator between a protruding position, in which the movable edge plate is protruding from the nacelle, and a retracted position, in which the movable edge plate is immobilized within the nacelle by the movable bolt when each locking mechanism is locked,
wherein the movable bolt is coupled to each locking mechanism, and
wherein the movable bolt comprises a rod, one control element associated with each locking mechanism, and at least one return member.

2. The aircraft nacelle as claimed in claim 1, wherein each control element comprises
a collar mounted movably on the rod and, associated with said collar,
a lever mounted in a manner hinged about a pivot axis perpendicular to the rod, a shoulder formed integrally with the rod, and a spring inserted around said rod and positioned between the shoulder and the collar.

3. The nacelle as claimed in claim 2, wherein the collar is cylindrical and is provided with an annular throat defining two annuli at the ends of the collar, the lever comprises a first branch and a second branch, one end of the first branch of the lever is configured to be received in the annular throat between the two annuli, and one end of the second branch of the lever cooperates with one of the at least two locking mechanisms.

4. The nacelle as claimed in claim 1, wherein the rod comprises a stop and is mounted so as to be movable in translation on at least one flange, the return member is inserted around the rod and is arranged between the stop and the flange.

5. The nacelle as claimed in claim 4, wherein the return member comprises a coil spring.

6. The nacelle as claimed in claim 1, wherein the movable edge plate comprises a guide support for guiding a panel and a second return member, the panel being inserted in the guide support.

7. The nacelle as claimed in claim 6, wherein the panel comprises a through-hole intended to accommodate an end of the rod.

8. The nacelle as claimed in claim 6, wherein the panel is painted in a bright color.

9. The nacelle as claimed in claim 8, wherein the panel is painted in one of orange or red.

10. An aircraft nacelle comprising:
a first and a second cowl mounted pivotably about an axis substantially parallel to a longitudinal axis of the nacelle and lockable to one another by at least one locking mechanism,
a device for providing a visual warning of a locking defect of the cowls comprising a movable bolt and a movable edge plate mounted on the nacelle in line with said movable bolt with which the movable edge plate is associated, the movable edge plate being movable under the action of an operator between a protruding position, in which the movable edge plate is protruding from the nacelle, and a retracted position, in which the movable edge plate is immobilized within the nacelle by the movable bolt when each locking mechanism is locked,
wherein the movable bolt is coupled to each locking mechanism, and
wherein the movable bolt comprises a rod, one control element associated with each locking mechanism, and at least one return member, wherein each control element comprises
a collar mounted movably on the rod and, associated with said collar,
a lever mounted in a manner hinged about a pivot axis perpendicular to the rod, a shoulder formed integrally with the rod, and a spring inserted around said rod and positioned between the shoulder and the collar.

11. The nacelle as claimed in claim 10, wherein the rod comprises a stop and is mounted so as to be movable in translation on at least one flange, the return member is inserted around the rod and is arranged between the stop and the flange.

12. The nacelle as claimed in claim 11, wherein the return member comprises a coil spring.

13. The nacelle as claimed in claim 11, wherein the movable edge plate comprises a guide support for guiding a panel and a second return member, the panel being inserted in the guide support.

14. The nacelle as claimed in claim 13, wherein the panel comprises a through-hole intended to accommodate an end of the rod.

15. The nacelle as claimed in claim 13, wherein the panel is painted in a bright color.

16. The nacelle as claimed in claim 15, wherein the panel is painted in one of orange or red.

17. An aircraft nacelle comprising:
a first and a second cowl mounted pivotably about an axis substantially parallel to a longitudinal axis of the nacelle and lockable to one another by at least one locking mechanism,
a device for providing a visual warning of a locking defect of the cowls comprising a movable bolt and a movable edge plate mounted on the nacelle in line with said movable bolt with which the movable edge plate is associated, the movable edge plate being movable under the action of an operator between a protruding position, in which the movable edge plate is protruding from the nacelle, and a retracted position, in which the movable edge plate is immobilized within the nacelle by the movable bolt when each locking mechanism is locked,
wherein the movable bolt is coupled to each locking mechanism, and
wherein the movable bolt comprises a rod, one control element associated with each locking mechanism, and at least one return member, wherein each control element comprises
a collar mounted movably on the rod and,
associated with said collar, a lever mounted in a manner hinged about a pivot axis perpendicular to the rod, a shoulder formed integrally with the rod, and a spring inserted around said rod and positioned between the shoulder and the collar,
wherein the collar is cylindrical and is provided with an annular throat defining two annuli at the ends of the collar, the lever comprises a first branch and a second branch, one end of the first branch of the lever is configured to be received in the annular throat between the two annuli, and one end of the second branch of the lever cooperates with the at least one locking mechanism.

18. The nacelle as claimed in claim 17, wherein the rod comprises a stop and is mounted so as to be movable in translation on at least one flange, the return member is inserted around the rod and is arranged between the stop and the flange.

19. The nacelle as claimed in claim 18, wherein the return member comprises a coil spring.

20. The nacelle as claimed in claim 18, wherein the movable edge plate comprises a guide support for guiding a panel and a second return member, the panel being inserted in the guide support.

* * * * *